(12) United States Patent
Mayhew

(10) Patent No.: US 10,480,623 B2
(45) Date of Patent: Nov. 19, 2019

(54) AUTOMATIC TRANSMISSION FOR A VEHICLE

(71) Applicant: William Mayhew, Ann Arbor, MI (US)

(72) Inventor: William Mayhew, Ann Arbor, MI (US)

(73) Assignee: FCA US LLC, Auburn Hills, MI (US)

(*) Notice: Subject to any disclaimer, the term of this patent is extended or adjusted under 35 U.S.C. 154(b) by 55 days.

(21) Appl. No.: 15/487,007

(22) Filed: Apr. 13, 2017

(65) Prior Publication Data

US 2018/0298991 A1 Oct. 18, 2018

(51) Int. Cl.
*F16H 3/66* (2006.01)
*F16H 3/44* (2006.01)

(52) U.S. Cl.
CPC ......... *F16H 3/66* (2013.01); *F16H 2003/442* (2013.01); *F16H 2003/445* (2013.01); *F16H 2200/0065* (2013.01); *F16H 2200/2012* (2013.01); *F16H 2200/2046* (2013.01); *F16H 2200/2064* (2013.01); *F16H 2200/2066* (2013.01); *F16H 2200/2082* (2013.01); *F16H 2200/2094* (2013.01)

(58) Field of Classification Search
CPC ................. F16H 3/66; F16H 2003/445; F16H 2003/447; F16H 2200/2094; F16H 2200/2082; F16H 2200/2066; F16H 2200/2064; F16H 2200/2012; F16H 2200/0065; F16H 2200/2041
See application file for complete search history.

(56) References Cited

U.S. PATENT DOCUMENTS

| 5,106,348 | A | 4/1992 | Koivunen |
| 7,694,793 | B2 | 4/2010 | Wittkopp et al. |
| 8,083,042 | B2 | 12/2011 | Samie et al. |
| 8,202,198 | B2 | 6/2012 | Samie et al. |
| 9,822,854 | B1* | 11/2017 | Diemer ............ F16H 3/66 |
| 2014/0038764 | A1* | 2/2014 | Goleski ........... F16H 3/66 475/275 |
| 2015/0087467 | A1* | 3/2015 | Singh ............ F16D 25/00 |
| 2016/0047466 | A1* | 2/2016 | Otanez ............ F16H 59/44 701/51 |
| 2017/0268585 | A1* | 9/2017 | Heitzenrater ....... F16D 25/00 |

FOREIGN PATENT DOCUMENTS

| WO | 1992019889 A1 | 11/1992 |
| WO | 2010011479 A2 | 1/2010 |

* cited by examiner

*Primary Examiner* — Jacob S. Scott
*Assistant Examiner* — Lori Wu
(74) *Attorney, Agent, or Firm* — Ralph E. Smith

(57) ABSTRACT

A multi-speed automatic transmission includes a housing, a transmission input shaft, and a plurality of clutches. Different combinations of a predetermined number of clutches of the plurality of clutches generate respective different gear ratios corresponding to respective forward or rearward speeds of the automatic transmission. The plurality of clutches includes a first clutch comprising a multi-plate clutch portion and a selectable one way clutch portion. The selectable one way clutch is utilized for generating one forward speed and one rearward speed of the automatic transmission.

11 Claims, 3 Drawing Sheets

| GEAR | BRAKE/CLUTCH ||||  DOG CLUTCH || RATIO | RATIO/STEPS |
|---|---|---|---|---|---|---|---|---|
|  | C | D | B | E | F | A |  |  |
| 1 |   | O |   |   | O | O | 4.70 |  |
| 2 | O |   |   |   | O | O | 2.84 | 1.65 |
| 3 |   |   | O |   | O | O | 1.90 | 1.49 |
| 4 |   |   |   | O | O | O | 1.38 | 1.38 |
| 5 | O |   | O | O |   | O | 1.00 | 1.38 |
| 6 |   |   |   | O |   | O | 0.80 | 1.24 |
| 7 | O |   |   | O |   | O | 0.70 | 1.16 |
| 8 |   | O |   | O |   |   | 0.58 | 1.21 |
| 9 |   | O | O | O |   |   | 0.48 | 1.21 |
| R |   | O | O |   | O |   | -3.80 | TOTAL 9.81 |

FIG. 3

AUTOMATIC TRANSMISSION FOR A VEHICLE

FIELD

The present application relates generally to an automatic transmission and, more particularly, to a clutch arrangement for improved shifting performance of a motor vehicle automatic transmission.

BACKGROUND

As vehicles become smaller and more advanced, it is often desirable to provide vehicle components with reduced parts and in more compact packaging to thereby reduce overall vehicle weight and improve vehicle fuel economy. For example, it is desirable to provide a vehicle transmission with reduced components and compact packaging while still providing improved performance over known transmissions.

SUMMARY

In accordance with one example aspect of the invention, a multi-speed automatic transmission is provided. The multi-speed automatic transmission includes, in an exemplary implementation, a housing, a transmission input shaft, and a plurality of clutches. Different combinations of a predetermined number of clutches of the plurality of clutches generate respective different gear ratios corresponding to respective forward or rearward speeds of the automatic transmission. The plurality of clutches includes a first clutch comprising a multi-plate clutch portion and a selectable one way clutch portion. The selectable one way clutch is utilized for generating one forward speed and one rearward speed of the automatic transmission.

In addition to the foregoing, the described automatic transmission may include one or more of the following features: wherein the multi-plate clutch portion of the first clutch is utilized in generating three forward speeds of the automatic transmission; wherein the selectable one way clutch portion is movable between a forward torque holding mode and a rearward torque holding mode; wherein in the forward torque holding mode, the selectable one way clutch portion is configured to transfer torque in a first rotational direction but not in an opposite second rotational direction, and wherein in the rearward torque holding mode, the selectable one way clutch portion is configured to transfer torque in the second rotational direction but not in the first rotational direction; wherein the selectable one way clutch portion is operated in the forward torque holding mode in nine forward speeds of the automatic transmission, the selectable one way clutch portion is operated in the rearward torque holding mode in one rearward speed of the automatic transmission, and the multi-plate clutch portion is utilized to transfer torque in three of the nine forward speeds; wherein the selectable one way clutch portion includes an input driving member coupled to a ring gear and an output driven member coupled to the transmission housing; a control member configured to move the first clutch between an engaged state and a disengaged state; wherein the multi-plate clutch portion includes a retainer and a clutch pack; wherein the retainer is grounded to the housing and the clutch pack includes alternating first and second friction discs; wherein the first friction discs are coupled to a ring gear and configured to rotate therewith, and the second friction discs are grounded to the transmission housing through the retainer; and wherein the first friction discs comprise only two first friction discs.

In accordance with another example aspect of the invention, a nine-speed automatic transmission is provided. The nine-speed automatic transmission includes, in an exemplary implementation, a housing, a transmission input shaft, a first clutch coupled to the transmission input shaft, a second clutch, a third clutch, a fourth clutch comprising a multi-plate clutch portion and a selectable one way clutch portion, the selectable one way clutch portion utilized for generating one forward speed and one rearward speed of the automatic transmission, a fifth clutch, and a sixth clutch.

In addition to the foregoing, the described nine-speed automatic transmission may include one or more of the following features: wherein the selectable one way clutch portion is movable between a forward torque holding mode and a rearward torque holding mode; wherein in the forward torque holding mode, the selectable one way clutch portion is configured to transfer torque in a first rotational direction but not in an opposite second rotational direction, and wherein in the rearward torque holding mode, the selectable one way clutch portion is configured to transfer torque in the second rotational direction but not in the first rotational direction; wherein the selectable one way clutch portion is operated in the forward torque holding mode in nine forward speeds of the automatic transmission, the selectable one way clutch portion is operated in the rearward torque holding mode in one rearward speed of the automatic transmission, and the multi-plate clutch portion is utilized to transfer torque in three of the nine forward speeds; wherein the selectable one way clutch portion transfers torque in one of the nine forward speeds and overruns in eight of the nine forward speeds; and wherein the selectable one way clutch portion transfers torque in a first gear and the reverse gear of the automatic transmission, and the multi-plate clutch portion transfers torque in a seventh, eighth, and ninth gear of the automatic transmission.

BRIEF DESCRIPTION OF DRAWINGS

FIG. 3 is a table illustrating engagement of various transmission clutches in connection with shifting of various transmission gears in accordance with the principles of the present application.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

As briefly mentioned above, the present application is directed to a system and method for improving shifting in an automatic transmission. In one exemplary implementation, the present application relates to an improved system and method for engaging a clutch element by reducing the number of clutch plates and incorporating a selectable one way clutch operably associated with a compact piston assembly. This enables a redesigned clutch element to improve engagements, disengagements, and controls. As such, the redesigned clutch element is configured to selectively hold either forward or reverse reaction torque while also allowing overrun in $2^{nd}$ through $6^{th}$ gears.

Figure 1:
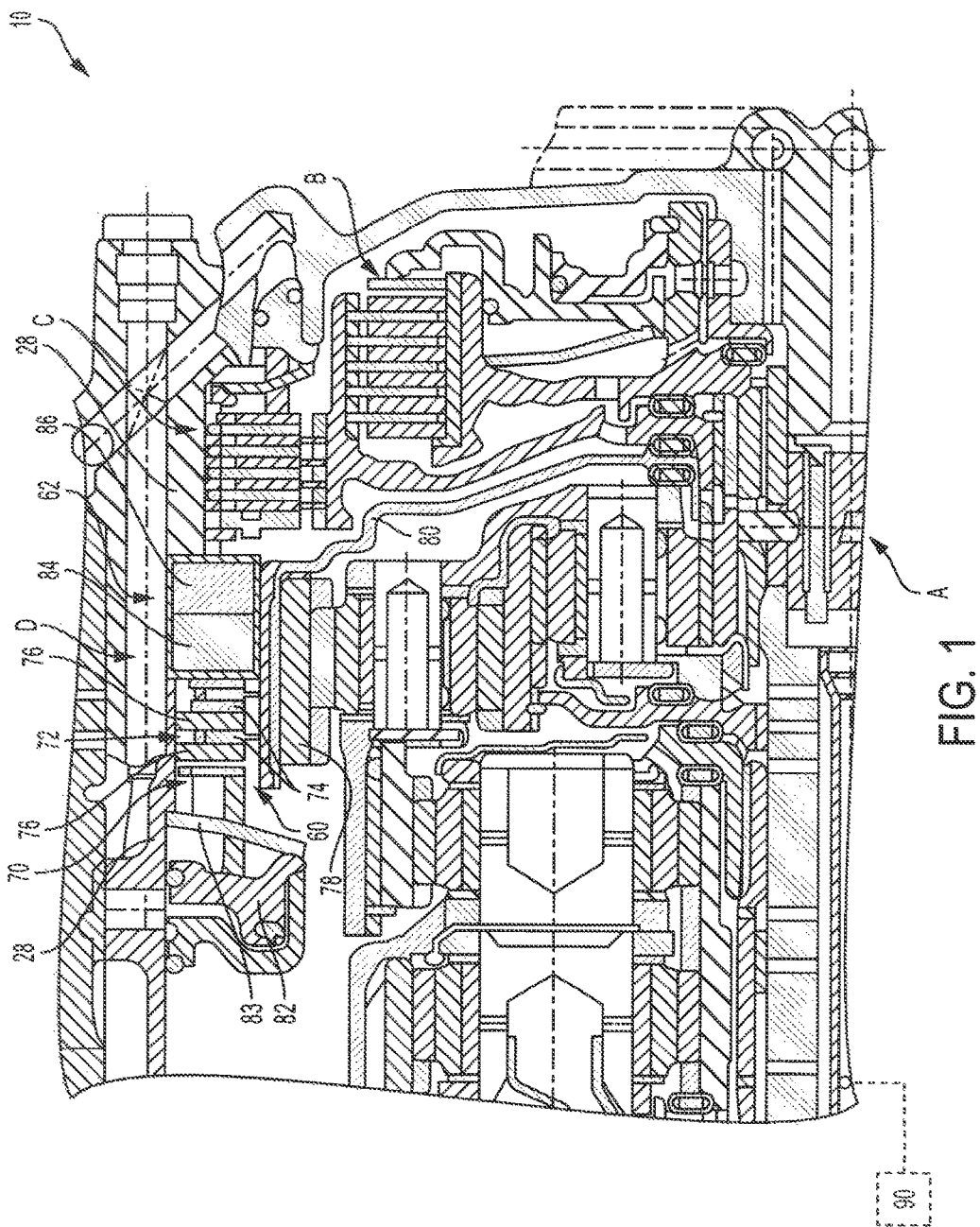
FIG. 1 is a partial schematic view of an exemplary motor vehicle nine-speed automatic transmission in accordance with the principles of the present application.
Figure 2:
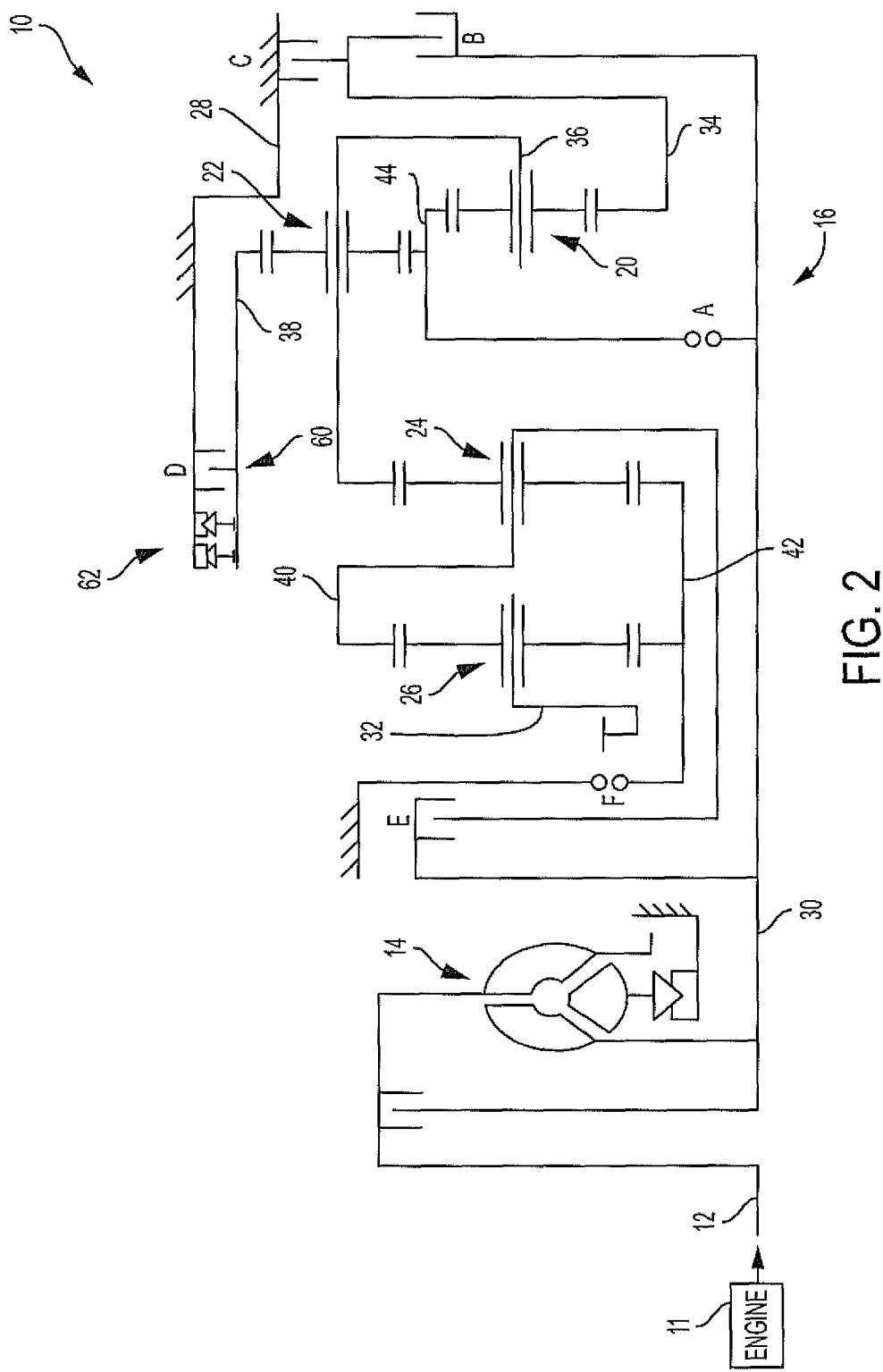
FIG. 2 is a partial schematic illustration of the exemplary automatic transmission of FIG. 1 in accordance with the principles of the present, application.

Referring to FIGS. 1 and 2, a nine-speed automatic transmission for use in a motor vehicle is generally shown and indicated at reference numeral 10. However, the systems and methods described herein are not limited to nine-speed automatic transmissions and may be utilized in other transmissions such as, for example, an eight-speed automatic transmission. As shown in FIG. 2, the nine-speed automatic transmission 10 is linked to an engine 11 through an engine output shaft 12. Rotational output from the engine output shaft 12 is received by the automatic transmission 10 through a torque converter assembly 14. The torque converter assembly 14 then transfers the rotational output through a gear set 16 to a transmission output shaft 32, and then on to the drivetrain of the motor vehicle.

The gear set 16 of the automatic transmission 10 includes a first planetary gear set 20, a second planetary gear set 22, a third planetary gear set 24, a fourth planetary gear set 26, and a housing 28. The first and second planetary gear sets 20, 22 may form a shiftable front-mounted gear set, and the third and fourth planetary gear sets 24, 26 may form a main gear set.

With particular reference to FIG. 2, in the exemplary implementation, the automatic transmission 10 comprises six shift elements including three clutches and three brakes. In particular, automatic transmission 10 includes a first clutch A, a second clutch B, a third clutch E, and a fourth clutch F, as well as a first brake/clutch C and a second brake/clutch D. In the example nine-speed automatic transmission 10, selective shifting of nine forward gears and one reverse gear are accomplished with the six shift elements.

Clutches A and/or F are, in the exemplary implementation illustrated, designed as locking shift elements or dog clutch elements. In one exemplary implementation, the dog clutch A and/or F and associated components include a male externally splined clutch member, a female internally splined clutch member configured to receive the male clutch member for engagement of the dog clutch A or F, a piston, a sensing sleeve and associated sensor(s) and fluid passages. In this exemplary implementation, the male externally splined clutch member is coupled to the dog clutch piston.

In one exemplary implementation, the automatic transmission 10 includes eight rotatable shafts 30, 32, 34, 36, 38, 40, 42, and 44, as illustrated in FIG. 2. The clutches A, B, and E are each selectively engageable to receive torque input from the torque converter assembly 14 via transmission input shaft 30. The carriers of the first and second planetary gear sets 20, 22 are coupled together by shaft 36, which is connected to the ring gear of the third planetary gear set 24. The ring gear of the first planetary gear set 20 is coupled to the sun gear of the second planetary gear set 22 through shaft 44, which is selectively coupled to the input shaft 30 by clutch A.

The sun gear of the first planetary gear set 20 is coupled to housing 28 through shaft 34 and the brake clutch C. The first planetary gear set 20 may be selectively coupled to the transmission input shaft 30 through dog clutch A. The ring gear of the second planetary gear set 22 is coupled to the housing 28 through shaft 38 and brake clutch D. As described herein in more detail, in one example implementation, clutch D comprises a combination friction clutch and a selectable one way clutch.

In the exemplary implementation, shaft 40 is coupled to the ring gear of the fourth planetary gear set 26 and to the carrier of the third planetary gear set 24. The shaft 40 is selectively coupled to the transmission input shaft 30 and clutch E, while shaft 42 is coupled to the sun gears of the third and fourth planetary gear sets 24, 26. The shaft 42 is coupled to transmission housing 28 through dog clutch F. The output shaft 32, which produces output drive for the vehicle, is coupled to the carrier of the fourth planetary gear set 26.

With continued reference to FIG. 1, in the example implementation, brake clutch D comprises a multi-plate clutch 60 and a selectable one way clutch 62. In this way, brake clutch D is capable of holding forward torque in first gear utilizing selectable one way clutch 62, allowing overrun in second through sixth gears, transferring torque in seventh through ninth gears utilizing multi-plate clutch 60, and holding rearward torque in reverse gear utilizing selectable one way clutch 62. This enables the number of plates of clutch 60 to be greatly reduced compared to a brake clutch D without the selectable one way clutch 62.

In the example embodiment, multi-plate clutch 60 includes a housing or retainer 70 and a clutch pack 72. The retainer 70 is grounded to the transmission housing 28, and the clutch pack 72 includes alternating first and second sets of friction discs 74, 76. The first friction discs 74 are coupled to a ring gear 78 (FIG. 1) and shaft 38 (FIG. 2), and the second friction discs 76 are grounded to transmission housing 28 through the retainer 70. As shown in FIG. 1, ring gear 78 is coupled to a hub 80, which is configured to rotate freely when brake clutch D is disengaged. Accordingly, when brake clutch D is disengaged, the first friction discs 74 rotate freely with shaft 38. When brake clutch D is engaged, for example through pressure applied by a hydraulic piston 82 (FIG. 1), first friction discs 74 engage the grounded second friction discs 76, which prevents rotation of discs 74 and shaft 38. A return spring 83 causes first friction discs 74 to disengage the second friction discs 76 when the hydraulic pressure is released from hydraulic piston 82. For example, brake clutch D may be engaged via friction discs 74, 76 in gears 7-9.

In the illustrated embodiment shown in FIG. 1, selectable one way clutch 62 is illustrated schematically. As known in the art, a selectable one way clutch 62 operates as a basic one way clutch, but is capable of operating as a one way clutch in the opposite direction. In addition, torque transfer may be disengaged in either direction. As such, the selectable one way clutch 62 can be overrun in one or both directions of rotation. In the illustrated example, selectable one way clutch 62 generally includes an input driving member 84 and an output driven member 86. However, it will be appreciated that selectable one way clutch 62 may have any suitable structure that enables clutch D to function as described herein. In the example embodiment, driven member 86 is fixed to transmission housing 28 in a suitable manner (e.g., splines), and driving member 84 is coupled to ring gear 78.

A typical selectable one way clutch such as clutch 62 includes a mechanical lock, such as spring loaded struts, levers, or other suitable torque transmitting devices (not shown), to enable the selectable one way clutch 62 to switch between a forward torque holding mode, a rearward torque holding mode, and a neutral mode. Accordingly, in the forward torque holding mode, selectable one way clutch 62 can selectively transfer torque between driving member 84 and driven member 86 in the forward (e.g., clockwise) rotational direction. Reversing the direction of rotation of driving member 84 allows driven member 86 to overrun (spin freely) in the rearward rotational direction with respect to driving member 84.

Similarly, in the rearward torque holding mode, selectable one way clutch 62 can selectively transfer torque between driving member 84 and driven member in the rearward (e.g., counter-clockwise) rotational direction. Reversing the direction of rotation of driving member 84 allows driven member 86 to overrun in the forward rotational direction with respect to driving member 84. In the neutral mode, selectable one way clutch 62 allows bi-directional overrun and does not transfer torque between driving member 84 and driven member 86 in either the forward or rearward rotational directions. In the example implementation, selectable one way clutch 62 operates in the forward torque holding mode in gears 1-9, and the rearward torque holding mode in Reverse gear.

With additional reference to FIG. 3, one example operation of transmission 10 will be described. In first gear, hydraulic piston 82 is engaged and brake clutch D is operated with selectable one way clutch 62 in the forward torque holding mode. In this way, hydraulic piston 82 compresses clutch pack 72, which engages selectable one way clutch 62, and an additional control or member (not shown) engages clutch 62 such that torque is transferred between driving member 84 and driven member 86 in the forward rotational direction, but not in the rearward rotational direction.

During upshift between the first and second gears, hydraulic piston 82 is released and first friction discs 74 and ring gear 78 are rotated in the forward direction. Since selectable one way clutch 62 is a mechanical device and in the forward torque holding mode, clutch 62 allows overrun of first friction discs 74 and ring gear 78. Accordingly, when the second gear clutch arrangement engages, it will cause the selectable one way clutch 62 to automatically spin at the correct point, without need for added synchronization systems.

During upshift between second and sixth gears, selectable one way clutch 62 holds torque. However, because first friction discs 74 and ring gear 78 are rotating in the forward rotational direction during these transmission gears, selectable one way clutch 62 is overrun and does not transfer torque.

During upshift between sixth and seventh gears, hydraulic piston 82 is actuated and multi-plate clutch 60 is engaged to prevent rearward rotation of first friction discs 74 by engagement with the second friction discs 76. Engagement of multi-plate clutch 60 is maintained throughout gears 7-9.

During a shift into the Reverse gear, selectable one way clutch 62 is transitioned to the reverse torque holding mode, for example, via a controller 90 (FIG. 1). The additional control or member (not shown) engages clutch 62 such that torque is transferred between driving member 84 and driven member 86 in the rearward rotational direction, but not in the forward rotational direction. Since selectable one way clutch 62 is utilized during the Reverse gear (a high torque transfer gear), the size and number of frictions discs of multi-plate clutch 60 can be reduced (e.g., from two to four) since multi-plate clutch 60 is not required for torque transfer in the Reverse gear. Upon shifting from the Reverse gear back into a forward gear, controller 90 switches selectable one way clutch 62 back into the forward torque holding mode.

Controller 90 is in signal communication with transmission 10 and includes shifting logic to transition the selectable one way clutch 62 between the forward torque holding mode, the rearward torque holding mode, and the neutral mode. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

Additionally, if engine 11 includes an automatic stop/start system and the actuation for the selectable one way clutch 62 is electronic or a self-latching system, then the transmission 10 has a mechanically engaged first gear. In such an arrangement, the transmission 10 is configured to remain in an engine off condition indefinitely, and will not add any delay when the engine starts and the driver wants to drive the vehicle forward.

The systems and methods described herein provide an automatic transmission with improved shifting and lower clutch gain. The transmission replaces a typical multi-plate arrangement of clutch element D with a combination smaller multi-plate arrangement and selectable one way clutch. The selectable one way clutch can be operated in a forward torque holding mode in gears 1-9, and a rearward torque holding mode in the Reverse gear. The selectable one way clutch transfers torque in first gear, is overrun in gears 2-6, and transfers torque in Reverse gear. The smaller multi-plate clutch is utilized to transfer torque in gears 7-9. Because the high torque required in Reverse gear is transferred by the selectable one way clutch, the smaller multi-plate clutch may be utilized for low torque transfer in the forward gears 7-9, thereby reducing the number of required friction plates. In addition, the clutch element D arrangement described herein enables a smaller, more compact hydraulic piston arrangement. Accordingly, the arrangement described herein enables a more compact automatic transmission with reduced components, thereby reducing costs and improving vehicle fuel economy.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:
1. A multi-speed automatic transmission comprising:
a housing;
a transmission input shaft; and
a plurality of clutches, wherein different combinations of a predetermined number of clutches of the plurality of clutches generate respective different gear ratios corresponding to respective forward or rearward speeds of the automatic transmission, the plurality of clutches including:
a first clutch comprising a multi-plate clutch portion and a selectable one way clutch portion, wherein the selectable one way clutch is engaged for selectively generating one forward speed and one rearward speed of the automatic transmission, wherein the selectable one way clutch portion is movable between a forward torque holding mode configured to transfer torque in a first rotational direction but not in an opposite second rotational direction, and a rearward torque holding mode configured to transfer torque in the second rotational direction but not in the first rotational direction, and wherein the selectable one way clutch portion is operated in the forward torque holding mode in nine forward speeds of the automatic transmission, the selectable one way clutch portion is operated in the rearward torque holding mode in the one rearward speed of the automatic transmission, and the multi-plate clutch portion is selectively engaged to transfer torque in three of the nine forward speeds, wherein the nine forward speeds includes the one forward speed.

2. The automatic transmission of claim 1, wherein the selectable one way clutch portion includes an input driving member coupled to a ring gear and an output driven member coupled to the transmission housing.

3. The automatic transmission of claim 1, further comprising a controller configured to move the multi-plate clutch portion between an engaged state and a disengaged state.

4. The automatic transmission of claim 1, wherein the multi-plate clutch portion includes a retainer and a clutch pack.

5. The automatic transmission of claim 4, wherein the retainer is grounded to the housing and the clutch pack includes alternating first and second friction discs.

6. The automatic transmission of claim 5, wherein the first friction discs are coupled to a ring gear and configured to rotate therewith, and the second friction discs are grounded to the transmission housing through the retainer.

7. The automatic transmission of claim 6, wherein the first friction discs comprise only two first friction discs.

8. A nine-speed automatic transmission comprising:
a housing;
a transmission input shaft;
a first clutch coupled to the transmission input shaft;
a second clutch;
a third clutch;
a fourth clutch comprising a multi-plate clutch portion and a selectable one way clutch portion, wherein the selectable one way clutch portion is engaged to selectively generate one forward speed and one rearward speed of the automatic transmission;
a fifth clutch; and
a sixth clutch, wherein the selectable one way clutch portion is movable between a forward torque holding mode configured to transfer torque in a first rotational direction but not in an opposite second rotational direction, and a rearward torque holding mode configured to transfer torque in the second rotational direction but not in the first rotational direction, wherein the selectable one way clutch portion is operated in the forward torque holding mode in nine forward speeds of the automatic transmission, the selectable one way clutch portion is operated in the rearward torque holding mode in the one rearward speed of the automatic transmission, and the multi-plate clutch portion is engaged to selectively transfer torque in three of the nine forward speeds, wherein the nine forward speeds includes the one forward speed.

9. The automatic transmission of claim 8, wherein the selectable one way clutch portion transfers torque in one of the nine forward speeds and overruns in eight of the nine forward speeds.

10. The automatic transmission of claim 9, wherein the selectable one way clutch portion transfers torque in a first gear and the one rearward speed of the automatic transmission, and the multi-plate clutch portion transfers torque in a seventh, eighth, and ninth gear of the automatic transmission.

11. A multi-speed automatic transmission comprising:
a housing;
a transmission input shaft; and
a plurality of clutches, wherein different combinations of a predetermined number of clutches of the plurality of clutches generate respective different gear ratios corresponding to respective forward or rearward speeds of the automatic transmission, the plurality of clutches including:
a first clutch comprising a multi-plate clutch portion and a selectable one way clutch portion, wherein the selectable one way clutch is engaged for selectively generating one forward speed and one rearward speed of the automatic transmission, wherein the multi-plate clutch portion includes a retainer and a clutch pack, wherein the retainer is grounded to the housing and the clutch pack includes alternating first and second friction discs, and wherein the first friction discs are coupled to a ring gear and configured to rotate therewith, and the second friction discs are grounded to the transmission housing through the retainer.

* * * * *